(12) United States Patent
Colton et al.

(10) Patent No.: US 8,260,845 B1
(45) Date of Patent: *Sep. 4, 2012

(54) SYSTEM AND METHOD FOR AUTO-GENERATING JAVASCRIPT PROXIES AND META-PROXIES

(75) Inventors: Paul Colton, Hillsborough, CA (US); Uri Sarid, Menlo Park, CA (US); Kevin Edward Lindsey, Benbrook, TX (US)

(73) Assignee: Appcelerator, Inc., Mountain View, CA (US)

(*) Notice: Subject to any disclaimer, the term of this patent is extended or adjusted under 35 U.S.C. 154(b) by 107 days.

This patent is subject to a terminal disclaimer.

(21) Appl. No.: 12/275,182

(22) Filed: Nov. 20, 2008

Related U.S. Application Data

(60) Provisional application No. 60/989,795, filed on Nov. 21, 2007.

(51) Int. Cl.
*G06F 15/16* (2006.01)
(52) U.S. Cl. ........ 709/203; 709/202; 709/217; 709/219; 709/226; 709/229
(58) Field of Classification Search .................. 709/202, 709/203, 217, 219, 226, 229
See application file for complete search history.

(56) References Cited

U.S. PATENT DOCUMENTS

| | | | |
|---|---|---|---|
| 4,989,132 A | 1/1991 | Mellender et al. | |
| 5,361,351 A | 11/1994 | Lenkov et al. | |
| 5,448,740 A | 9/1995 | Kiri et al. | |
| 5,812,851 A | 9/1998 | Levy et al. | |
| 5,821,851 A | 10/1998 | Blackmer | |
| 5,878,223 A | 3/1999 | Becker et al. | |
| 6,067,413 A | 5/2000 | Gustafsson et al. | |
| 6,144,962 A | 11/2000 | Weinberg et al. | |
| 6,185,587 B1 | 2/2001 | Bernardo et al. | |
| 6,192,382 B1 | 2/2001 | Lafer et al. | |
| 6,240,414 B1 | 5/2001 | Beizer et al. | |
| 6,324,686 B1 | 11/2001 | Komatsu et al. | |
| 6,356,283 B1 | 3/2002 | Guedalia | |
| 6,381,737 B1 | 4/2002 | Click, Jr. et al. | |
| 6,453,335 B1 | 9/2002 | Kaufmann | |
| 6,539,433 B1 | 3/2003 | Tominaga et al. | |
| 6,609,246 B1 | 8/2003 | Guhr et al. | |
| 6,684,369 B1 | 1/2004 | Bernardo et al. | |
| 6,779,114 B1 | 8/2004 | Chow et al. | |
| 6,915,454 B1 | 7/2005 | Moore et al. | |
| 6,941,562 B2 | 9/2005 | Gao et al. | |
| 6,981,215 B1 * | 12/2005 | Lindhorst et al. | 715/207 |
| 6,990,653 B1 | 1/2006 | Burd et al. | |
| 7,000,008 B2 | 2/2006 | Bautista-Lloyd et al. | |
| 7,047,318 B1 | 5/2006 | Svedloff | |
| 7,051,084 B1 | 5/2006 | Hayton et al. | |
| 7,058,633 B1 | 6/2006 | Gnagy et al. | |
| 7,062,506 B2 * | 6/2006 | Taylor et al. | 1/1 |

(Continued)

OTHER PUBLICATIONS

Morfik announces Ajax IDE, Wednesday Sep. 28, 2005, ajaxian.com, pp. 1-3.

(Continued)

*Primary Examiner* — Liangche A Wang
(74) *Attorney, Agent, or Firm* — Dergosits & Noah LLP; Todd A. Noah

(57) ABSTRACT

A method, system, Web-environment and computer program product for automatically generating proxies and meta-proxies for script code in an HTML document. The invention preferably operates with a system that allows for JavaScript to be utilized on the server-side.

12 Claims, 12 Drawing Sheets

U.S. PATENT DOCUMENTS

| Patent Number | Kind | Date | Inventor(s) | Ref |
|---|---|---|---|---|
| 7,086,041 | B2 | 8/2006 | Plesko et al. | |
| 7,103,600 | B2 | 9/2006 | Mullins | |
| 7,103,881 | B2 | 9/2006 | Stone | |
| 7,117,504 | B2 | 10/2006 | Smith et al. | |
| 7,124,445 | B2 | 10/2006 | Cronce et al. | |
| 7,139,798 | B2 | 11/2006 | Zircher et al. | |
| 7,143,136 | B1 | 11/2006 | Drenan et al. | |
| 7,167,862 | B2 | 1/2007 | Mullins | |
| 7,213,231 | B1 | 5/2007 | Bandhole et al. | |
| 7,222,336 | B2 | 5/2007 | Willis | |
| 7,231,644 | B2 | 6/2007 | Kieffer | |
| 7,269,636 | B2 | 9/2007 | McCollum et al. | |
| 7,284,054 | B2 | 10/2007 | Radhakrishnan | |
| 7,308,648 | B1 | 12/2007 | Buchthal et al. | |
| 7,313,789 | B1 | 12/2007 | Yellin et al. | |
| 7,333,801 | B2 | 2/2008 | Chandhok | |
| 7,386,786 | B2 * | 6/2008 | Davis et al. | 715/234 |
| 7,389,330 | B2 * | 6/2008 | Dillon et al. | |
| 7,426,723 | B1 | 9/2008 | Nikolov | |
| 7,454,526 | B2 | 11/2008 | Brown et al. | |
| 7,478,401 | B2 * | 1/2009 | Irassar et al. | 719/313 |
| 7,478,408 | B2 | 1/2009 | Sesma | |
| 7,487,201 | B1 | 2/2009 | Murray et al. | |
| 7,496,841 | B2 | 2/2009 | Hadfield et al. | |
| 7,506,315 | B1 | 3/2009 | Kabadiyski et al. | |
| 7,509,654 | B2 * | 3/2009 | Jennings et al. | 719/318 |
| 7,543,267 | B2 | 6/2009 | Lindhorst et al. | |
| 7,543,271 | B2 | 6/2009 | Gadre | |
| 7,555,484 | B2 | 6/2009 | Kulkarni et al. | |
| 7,596,620 | B1 | 9/2009 | Colton et al. | |
| 7,614,052 | B2 | 11/2009 | Wei | |
| 7,653,623 | B2 | 1/2010 | Kashima et al. | |
| 7,685,609 | B1 | 3/2010 | McLellan | |
| 7,707,547 | B2 | 4/2010 | Colton et al. | |
| 7,725,530 | B2 | 5/2010 | Sah et al. | |
| 7,823,009 | B1 | 10/2010 | Tormasov et al. | |
| 7,844,958 | B2 | 11/2010 | Colton et al. | |
| 7,921,353 | B1 | 4/2011 | Murray | |
| 7,958,232 | B1 | 6/2011 | Colton et al. | |
| 7,958,493 | B2 | 6/2011 | Lindsey et al. | |
| 2001/0025373 | A1 | 9/2001 | Gebhart et al. | |
| 2001/0032320 | A1 | 10/2001 | Abdelnur et al. | |
| 2001/0037292 | A1 | 11/2001 | Vogt | |
| 2001/0037359 | A1 * | 11/2001 | Mockett et al. | 709/203 |
| 2002/0007393 | A1 | 1/2002 | Hamel | |
| 2002/0016828 | A1 | 2/2002 | Daugherty et al. | |
| 2002/0023158 | A1 | 2/2002 | Polizzi et al. | |
| 2002/0069255 | A1 | 6/2002 | Dinovo | |
| 2002/0073235 | A1 | 6/2002 | Chen et al. | |
| 2002/0099738 | A1 | 7/2002 | Grant | |
| 2002/0112247 | A1 | 8/2002 | Horner et al. | |
| 2002/0138555 | A1 | 9/2002 | Yu | |
| 2002/0184363 | A1 | 12/2002 | Viavant et al. | |
| 2003/0005044 | A1 | 1/2003 | Miller et al. | |
| 2003/0061404 | A1 | 3/2003 | Atwal et al. | |
| 2003/0084431 | A1 | 5/2003 | Kobayashi | |
| 2003/0088687 | A1 | 5/2003 | Begeja et al. | |
| 2003/0105810 | A1 | 6/2003 | McCrory et al. | |
| 2003/0145282 | A1 | 7/2003 | Thomas et al. | |
| 2003/0177176 | A1 | 9/2003 | Hirschfeld et al. | |
| 2003/0195923 | A1 | 10/2003 | Bloch et al. | |
| 2003/0226110 | A1 | 12/2003 | Scheering | |
| 2004/0003377 | A1 | 1/2004 | Di Loreto | |
| 2004/0010621 | A1 | 1/2004 | Afergan et al. | |
| 2004/0021679 | A1 | 2/2004 | Chapman et al. | |
| 2004/0061713 | A1 | 4/2004 | Jennings | |
| 2004/0064822 | A1 * | 4/2004 | Noda | 719/311 |
| 2004/0066410 | A1 | 4/2004 | Lindhorst et al. | |
| 2004/0133848 | A1 | 7/2004 | Hunt et al. | |
| 2004/0143823 | A1 | 7/2004 | Wei | |
| 2004/0158843 | A1 | 8/2004 | Cloccarelli | |
| 2004/0167784 | A1 | 8/2004 | Travieso et al. | |
| 2004/0167876 | A1 | 8/2004 | Salerno et al. | |
| 2004/0168162 | A1 | 8/2004 | Park et al. | |
| 2004/0177147 | A1 | 9/2004 | Joshi et al. | |
| 2004/0177335 | A1 | 9/2004 | Beisiegel et al. | |
| 2004/0201618 | A1 | 10/2004 | Alderson | |
| 2004/0205411 | A1 | 10/2004 | Hong et al. | |
| 2004/0210865 | A1 | 10/2004 | Shimura | |
| 2004/0225633 | A1 | 11/2004 | Jau | |
| 2004/0236927 | A1 | 11/2004 | Irie et al. | |
| 2004/0250262 | A1 | 12/2004 | Irassar et al. | |
| 2004/0268303 | A1 | 12/2004 | Abe et al. | |
| 2005/0005160 | A1 | 1/2005 | Bates et al. | |
| 2005/0015759 | A1 | 1/2005 | Zatloukal | |
| 2005/0027823 | A1 | 2/2005 | Rana | |
| 2005/0043940 | A1 | 2/2005 | Elder | |
| 2005/0044197 | A1 | 2/2005 | Lai | |
| 2005/0066319 | A1 | 3/2005 | DeLine et al. | |
| 2005/0069207 | A1 | 3/2005 | Zakrzewski et al. | |
| 2005/0086344 | A1 | 4/2005 | Suesserman | |
| 2005/0091576 | A1 | 4/2005 | Relyea et al. | |
| 2005/0091650 | A1 | 4/2005 | Heeb | |
| 2005/0102400 | A1 | 5/2005 | Nakahara et al. | |
| 2005/0144622 | A1 | 6/2005 | Ballinger et al. | |
| 2005/0160415 | A1 | 7/2005 | Kwon et al. | |
| 2005/0172338 | A1 | 8/2005 | Sandu et al. | |
| 2005/0182778 | A1 | 8/2005 | Heuer et al. | |
| 2005/0188051 | A1 | 8/2005 | Sneh | |
| 2005/0246391 | A1 | 11/2005 | Gross | |
| 2005/0256933 | A1 | 11/2005 | Millington et al. | |
| 2005/0278641 | A1 | 12/2005 | Mansour et al. | |
| 2006/0015842 | A1 | 1/2006 | DeSantis | |
| 2006/0047780 | A1 | 3/2006 | Patnude | |
| 2006/0064434 | A1 | 3/2006 | Gilbert et al. | |
| 2006/0075088 | A1 | 4/2006 | Guo et al. | |
| 2006/0080592 | A1 | 4/2006 | de Moura et al. | |
| 2006/0123397 | A1 | 6/2006 | McGuire | |
| 2006/0129997 | A1 | 6/2006 | Stichnoth et al. | |
| 2006/0136555 | A1 | 6/2006 | Patrick et al. | |
| 2006/0136712 | A1 | 6/2006 | Nagendra et al. | |
| 2006/0149746 | A1 | 7/2006 | Bansod et al. | |
| 2006/0150111 | A1 | 7/2006 | Farber | |
| 2006/0155707 | A1 | 7/2006 | Marcjan | |
| 2006/0167981 | A1 | 7/2006 | Bansod et al. | |
| 2006/0173998 | A1 | 8/2006 | Ohara | |
| 2006/0190997 | A1 | 8/2006 | Mahajani et al. | |
| 2006/0200503 | A1 | 9/2006 | Dosa et al. | |
| 2006/0230149 | A1 | 10/2006 | Jackson | |
| 2006/0253508 | A1 | 11/2006 | Colton et al. | |
| 2006/0259592 | A1 | 11/2006 | Angeline | |
| 2006/0277250 | A1 | 12/2006 | Cherry et al. | |
| 2007/0011650 | A1 | 1/2007 | Hage et al. | |
| 2007/0055964 | A1 | 3/2007 | Mirkazemi et al. | |
| 2007/0061700 | A1 | 3/2007 | Kothari et al. | |
| 2007/0067418 | A1 | 3/2007 | Isaacs et al. | |
| 2007/0073739 | A1 | 3/2007 | Jennings et al. | |
| 2007/0100967 | A1 | 5/2007 | Smith et al. | |
| 2007/0106946 | A1 | 5/2007 | Goetz et al. | |
| 2007/0107057 | A1 | 5/2007 | Chander et al. | |
| 2007/0113188 | A1 | 5/2007 | Bales et al. | |
| 2007/0124500 | A1 | 5/2007 | Bedingfield et al. | |
| 2007/0136201 | A1 | 6/2007 | Sah et al. | |
| 2007/0136477 | A1 | 6/2007 | Bryce et al. | |
| 2007/0143283 | A1 | 6/2007 | Spencer et al. | |
| 2007/0143672 | A1 | 6/2007 | Lipton et al. | |
| 2007/0150480 | A1 | 6/2007 | Hwang et al. | |
| 2007/0174419 | A1 | 7/2007 | O'Connell et al. | |
| 2007/0214239 | A1 | 9/2007 | Mechkov et al. | |
| 2007/0214261 | A1 | 9/2007 | Kikuchi et al. | |
| 2007/0231781 | A1 | 10/2007 | Zimmermann et al. | |
| 2007/0240032 | A1 | 10/2007 | Wilson | |
| 2007/0250513 | A1 | 10/2007 | Hall et al. | |
| 2007/0288858 | A1 | 12/2007 | Pereira et al. | |
| 2008/0010338 | A1 | 1/2008 | Curtis et al. | |
| 2008/0077556 | A1 | 3/2008 | Muriente | |
| 2008/0082965 | A1 | 4/2008 | Atkin et al. | |
| 2008/0104025 | A1 | 5/2008 | Dharamshi et al. | |
| 2008/0104224 | A1 | 5/2008 | Litofsky et al. | |
| 2008/0140786 | A1 | 6/2008 | Tran | |
| 2008/0243475 | A1 | 10/2008 | Everhart et al. | |
| 2008/0244586 | A1 | 10/2008 | Hopp | |
| 2008/0288739 | A1 | 11/2008 | Bamba et al. | |
| 2008/0294794 | A1 | 11/2008 | Darugar et al. | |
| 2008/0295004 | A1 * | 11/2008 | Coca et al. | 715/763 |
| 2008/0295164 | A1 | 11/2008 | Steiner et al. | |
| 2008/0301696 | A1 | 12/2008 | Tantawi et al. | |

| | | |
|---|---|---|
| 2008/0307389 A1 | 12/2008 | Marchant |
| 2009/0013255 A1 | 1/2009 | Yuschik et al. |
| 2009/0030926 A1 | 1/2009 | Aharoni et al. |
| 2009/0100154 A1 | 4/2009 | Stevenson et al. |
| 2009/0106052 A1 | 4/2009 | Moldovan |
| 2009/0106413 A1 | 4/2009 | Salo et al. |
| 2009/0119675 A1 | 5/2009 | Higgins et al. |
| 2009/0172792 A1 | 7/2009 | Backhouse |
| 2009/0210631 A1 | 8/2009 | Bosworth et al. |
| 2009/0216910 A1 | 8/2009 | Duchesneau |
| 2009/0282136 A1* | 11/2009 | Subramanian ............... 709/222 |
| 2009/0287734 A1 | 11/2009 | Borders |
| 2009/0300210 A1 | 12/2009 | Ferris |
| 2010/0035690 A1 | 2/2010 | Blackburn et al. |
| 2010/0036903 A1 | 2/2010 | Ahmad et al. |
| 2010/0042670 A1 | 2/2010 | Kamalakantha et al. |
| 2010/0064234 A1 | 3/2010 | Schreiber et al. |
| 2010/0070566 A1 | 3/2010 | Vandewalle |
| 2010/0174607 A1* | 7/2010 | Henkin et al. ............. 705/14.53 |
| 2010/0223385 A1 | 9/2010 | Gulley et al. |

OTHER PUBLICATIONS

Anonymous, Creating Accessible JavaScript—JavaScript Event Handlers, published at http://webaim.org/techniques/javascript/eventhandlers.
Written Opinion of the International Searching Authority for PCT/US07/01697.
Written Opinion of the International Searching Authority for PCT/US07/66673.
Niels Leenheer, rakaz, "Make your pages load faster by combining and compressing javascript and css files," Dec. 18, 2006, rakaz.nl/2006/12/make-your-pages-load-faster-by-combining-and-compressing-javascript-and-css-files.html, pp. 1-4.
Steve Vinoski, "Scripting JAX-WS," IEEE Internet Computing, May & Jun. 2006, pp. 91-94.
Mitchell, Scott, URL Rewriting in ASP.NET, published Mar. 2004 at http://msdn.microsoft.com/en-us/library/ms972974.aspx.
"Making JavaScript Smaller: Dojo's Compressor," downloaded from The Internet WaybackMachine http://web.archive.org/web/20061114133532/http://dojotoolkit.org/docs/compressor_system.html on Sep. 13, 2011, archived on Nov. 11, 2006.
"JSMIN, The JavaScript Minifier," Douglas Crockford, www.crockford.com, Dec. 4, 2003, downloaded Sep. 13, 2011 from http://www.crockford.com/javascript/jsmin.html.
Portions of the prosecution history of U.S. Appl. No. 11/735,428.
Portions of the prosecution history of U.S. Appl. No. 12/270,817.
Portions of the prosecution history of U.S. Appl. No. 12/270,868.
Portions of the prosecution history of U.S. Appl. No. 12/273,539.
Portions of the prosecution history of U.S. Appl. No. 12/275,213.
Portions of the prosecution history of U.S. Appl. No. 12/276,327.
Portions of the prosecution history of U.S. Appl. No. 12/276,336.
Portions of the prosecution history of U.S. Appl. No. 12/276,337.
Portions of the prosecution history of U.S. Appl. No. 12/325,239.
Portions of the prosecution history of U.S. Appl. No. 12/325,268.
Portions of the prosecution history of U.S. Appl. No. 12/326,103.
Portions of the prosecution history of U.S. Appl. No. 12/326,110.
Portions of the prosecution history of U.S. Appl. No. 12/326,861.
Portions of the prosecution history of U.S. Appl. No. 12/326,891.
Portions of the prosecution history of U.S. Appl. No. 12/326,910.
Portions of the prosecution history of U.S. Appl. No. 12/327,330.
Portions of the prosecution history of U.S. Appl. No. 12/327,802.
Portions of the prosecution history of U.S. Appl. No. 12/334,434.
Portions of the prosecution history of U.S. Appl. No. 12/352,240.
Portions of the prosecution history of U.S. Appl. No. 12/563,159.
Portions of the prosecution history of U.S. Appl. No. 12/766,908.
Portions of the prosecution history of U.S. Appl. No. 12/955,881.
Portions of the prosecution history of U.S. Appl. No. 13/154,090.
Portions of the prosecution history of U.S. Appl. No. 13/175,570.
Portions of the prosecution history of U.S. Appl. No. 12/325,240.
Gudeman, et al., Representing Type Information Dynamically Typed Languages; 1993, acquired from http://citeseerx.ist.psu.edu/viewdoc/download?doi=10.1.1.39.4394&rep=rep1&type=pdf, pp. 1.38.
Shao, et al., A type-based compiler for standard ML;ACM, 1995, pp. 116-129.
Server Side JavaScript Guide, Nov. 12, 1998, Netscape Communications Corp., pp. 1-4.
Lars Aronsson, Operation of a Large Scale, General Purpose Wiki Website, VWF Berlin, 2002, pp. 27-37.
Morfik announces Ajax IDE, Wednesday Sep. 28th, 2005, ajaxian.com, pp. 1-3.
Susanne Hupfer, Li-Te Cheng, Steven Ross, John Patterson, Introducing Collaboration into an Application Development Environment, Nov. 6-10, 2004, ACM, vol. 6, Issue 3; pp. 21-24.
Written Opinion of the International Searching Authority for PCT/US07/01697. Jan. 5, 2008.
Written Opinion of the International Searching Authority for PCT/US07/66673. Jul. 7, 2008.

* cited by examiner

SYSTEM AND METHOD FOR AUTO-GENERATING JAVASCRIPT PROXIES AND META-PROXIES

CROSS-REFERENCE TO RELATED APPLICATIONS

This Application claims priority to U.S. Provisional Patent Application No. 60/989,795, filed on Nov. 21, 2007, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to development of Web-sites and Web-applications. More specifically, the present invention relates to JavaScript proxies and meta-proxies.

2. Description of the Related Art

Prior to Rich Internet Applications, traditional Web applications involved a client-server architecture with all of the processing on the server side and the client-side used to display the HTML web-pages served by the server. Each time a user desired to view a new Web-page, a HTTP request was sent to the server and the requested Web-page was served to the Web browser on the client-side. Such a traditional system is shown in FIG. 1 with a Web-server 1000 on a server side receiving requests over the Internet 1005 from a Web-browser 1003 on a client-side.

Rich Internet Applications, such as Ajax, greatly improved on the traditional client-server architecture by allowing the client machine to dynamically render and partially refresh web pages based on an initial set of instructions from the server, user input, and small amounts of subsequent data dynamically requested from the server. As shown in FIG. 2, the client machine processes Ajax instructions to render a Web page for the user.

Early Web applications allowed a user's browser to send a request to a server. The server processed the request and responded to the browser with a Web page. When the user wanted to view a new page, another request was sent to the server and the server responded to the browser with a new Web page. Such a process resulted in a waste of bandwidth since much of the Web contents in the first Web page were also contained in the second web page. The need to resend the same information led to a much slower user interface of a Web application than that of a native application.

An emerging technology, called Ajax (Asynchronous and JavaScript XML), was developed for refreshing part of a page instead of refreshing the whole page on every interaction between the user and application. In an Ajax application, when a user submits a form in a page, a script program, usually a JavaScript program, resident on the Web browser receives the user's request and sends a XML (Extended Markup Language) HTTP (Hyper Text Transfer Protocol) request to the Web server in background so as to retrieve only the needed Web contents instead of the whole page and perform corresponding processing to partly refresh the page when receiving a response from the Web server. In this way, the application response time is shortened, because the amount of data exchanged between the Web browser and the Web server is greatly reduced. And the processing time of the Web server is saved because much of the processing is performed at the client side.

General definitions for terms utilized in the pertinent art are set forth below.

Ajax is the use of dynamic HTML, JavaScript and CSS to create dynamic and usually interactive Web sites and applications. A more detailed explanation of Ajax is set forth in Edmond Woychowsky, *AJAX, Creating Web Pages with Asynchronous JavaScript and XML*, Prentice Hall, 2007, which is hereby incorporated by reference in its entirety.

Applets or Java Applets are mini-executable programs named with the .class suffix and are placed on a Web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

An Attribute provides additional information about an element, object or file. In a Document Object Model, an attribute, or attribute node, is contained within an element node.

Behavioral layer is the top layer and is the scripting and programming that adds interactivity and dynamic effects to a site.

Binding in a general sense is the linking of a library to an application program usually to prevent repetition of frequently utilized code.

Cascading Style Sheets (CSS) is a W3C standard for defining the presentation of Web documents.

Compiler is a computer program that translates a series of instructions written in one computer language into a resulting output in a different computer language.

Document Object Model (DOM) Element is an object contained in a Document Object Model (DOM). The term DOM is generally used to refer to the particular DOM held in the memory region being used by the Web browser. Such a DOM controls the Graphical Respondent Interface (GRI) or Graphical User Interface (GUI). The DOM is generated according to the information that the Web browser reads from the HTML file, and/or from direct JavaScript software instructions. Generally, there exists a unique DOM element for every unique HTML element. DOM elements are sometimes referred to as HTML/DOM elements, because the DOM element exists only because HTML code that was read by the Web browser listed some HTML element that had not previously existed, and thereby caused the Web browser to create that DOM element. Often specific elements of the greater set of HTML/DOM elements are identified by specifying an HTML/DOM checkbox element, or an HTML/DOM text input element. A more detailed explanation of the document object model is set forth in Jeremy Keith, DOM Scripting, Web Design with JavaScript and the Document Object Model, friendsof, 2005, which is hereby incorporated by reference in its entirety.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server. Internet is the world-wide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid JavaScript syntax for reconstituting an object at the other end of the transmission protocol.

MySQL is a relational database management system which relies on SQL for processing data in a database.

Parser is a component of a compiler that analyzes a sequence of tokens to determine its grammatical structure with respect to a given formal grammer. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support Internet access and in particular the operation of interactive forms.

Presentation layer follows the structural layer, and provides instructions on how the document should look on the screen, sound when read aloud or be formatted when it is printed.

Rendering engine is software used with a Web browser that takes Web content (HTML, XML, image files) and formatting information (CSS, XSL) and displays the formatted content on a screen.

Serialization places an object in a binary form for transmission across a network such as the Internet and deserialization involves extracting a data structure from a series of bytes.

SQL (Structured Query Language) is a computer language designed for data retrieval and data management in a database.

Structural layer of a Web page is the marked up document and foundation on which other layers may be applied.

User is a client computer, generally operated by a human being, but in some system contexts running an automated process not under full-time human control.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

There are three types of JavaScript: 1) Client-side JavaScript; 2) Server-side JavaScript; and 3) Core JavaScript. Client-side JavaScript is generally an extended version of JavaScript that enables the enhancement and manipulation of web pages and client browsers. Server-side JavaScript is an extended version of JavaScript that enables back-end access to databases, file systems, and servers. Core JavaScript is the base JavaScript.

Core JavaScript includes the following objects: array, date, math, number and string. Client-side JavaScript and Server-side JavaScript have additional objects and functions that are specific to client-side or server-side functionality. Generally, any JavaScript libraries (.js files) created in core JavaScript can be used on both the client and the server without changes. Client-side JavaScript is composed of a Core JavaScript and additional objects such as: document, form, frame and window. The objects in Client-side JavaScript enable manipulation of HTML documents (checking form fields, submitting forms, creating dynamic pages) and the browser (directing the browser to load other HTML pages, display messages). Server-side JavaScript is composed of Core JavaScript and additional objects and functions for accessing databases and file systems, and sending email. Server-side JavaScript enables Web developers to efficiently create database-driven web applications. Server-side JavaScript is generally used to create and customize server-based applications by scripting the interaction between objects. Client-side JavaScript may be served by any server but only displayed by JavaScript-enabled browsers. Server-side JavaScript must be served by a JavaScript-enabled server but can be displayed by any browser.

United States Patent Publication Number 20010037359 describes a system and method for a server-side browser including markup language graphical user interface, dynamic markup language rewriter engine and profile engine. The system includes a user computer and a destination server computer separated by a server computer hosting a server-side browser (SSB). The SSB includes a markup language graphical user interface (MLGUI), a dynamic markup language rewriter engine (DMLRE) and a profiling engine (PE). The SSB may be configured as an intermediary infrastructure residing on the Internet providing customized information gathering for a user. The components of the SSB allow for controlling, brokering and distributing information more perfectly by controlling both browser functionality (on the client-side) and server functionality (on the destination site side) within a single point and without the necessity of incremental consents or integration of either side.

Irassar et al., United States Patent Publication Number 20040250262, for Business To Business Event Communications discloses an event handling mechanism that allows communication of event information among providers and subscribers across a network using an event handling server.

Jennings et al., United States Patent Publication Number 20070073739 for a Data-Driven And Plug-In Defined Event Engine, discloses an event engine that enables application developers to define finite state machines for implementation via a data-driven approach using executable plug-ins.

Lindhorst et al., U.S. Pat. No. 6,981,215 for a System For Converting Event-Driven Code Into Serially Executed Code, discloses an event-driven server model that uses active server pages that appear to other files as objects with associated method and properties for developing Web pages.

However, current technologies that operate Server-side JavaScript fail to offer complete interactions which are the hallmark of rich web sites and applications. When a developer designates some code to run on the server and be callable from the client, they are logically defining a web service or an RPC (Remote Procedure Call) entry point.

BRIEF SUMMARY OF THE INVENTION

The Present Invention overcomes the obstacles of the prior art. The present invention realizes a RPC, and by default also assumes that the only page from which this code should be called client-side is the page that included that code server-side. The present invention therefore automatically removes and stores the server-side code, and then injects into the client-side page new JavaScript code with the same name: the proxy code. The proxy code will accept (on the client) the same inputs as the original, server-side function; it will package up the data and then remotely call the server, which will verify that the call came from the same page it was defined in, find (or reconstitute) the original code, pass it the data, and when that function completes the returned data (if any) is packaged up, returned to the client, and becomes the return value from the proxy code. All of this is done automatically with the present invention. Moreover, the present invention architecture also allows the insertion of "meta-proxy" code: code that, upon arrival on the client, or upon other client-side events, will then create the necessary proxies. For example, if a large library is callable from the client, but may or may not actually get called, the present invention simply emits a meta-proxy to the client, and does not store the entire library server-side. Instead, the meta-proxy would "listen" for any invocation of the library on the client, and when it detects that it will call the server, which will return the set of proxies that need to dynamically be created on the client for full access to that library. The server can also load that library dynamically as it's needed, either when the meta-proxy first detects the call, or when the proxy functions are invoked One aspect of the present invention is a method for automatically generating proxies. The method includes providing a code operating on a server-side and callable from a client-side. The method also includes assuming a page of the code which is callable from the client-side is a page which includes the code server-side. The method further includes automatically removing and storing the server-side code. The method further includes injecting into a client-side page proxy code with a same name as the original code.

Another aspect of the present invention is a method for automatically generating meta-proxies. The method includes providing a code operating on a server-side and callable from a client-side. The method also includes assuming a page of the code which is callable from the client-side is a page which includes the code server-side. The method further includes automatically removing and storing the server-side code. The method further includes injecting into a client-side page meta-proxy code with a same name as the original code. The method further includes generating a plurality of proxies on the client-side upon a client-side event.

Yet another aspect of the present invention is a JavaScript server architecture which includes means for automatically processing an original code for a HTML page running on a server-side and callable on a client-side to remove and store the original code, and a framework written in JavaScript. The framework includes means for generating a proxy code for the original code and means for injecting the proxy code into the HTML page.

Yet another aspect of the present invention is a method for automatically generating proxies for synchronous calls and asynchronous calls. The method includes providing a code operating on a server-side and callable from a client-side. The method also includes assuming a page of the code which is callable from the client-side is a page which includes the code server-side. The method further includes automatically removing and storing the server-side code. The method further includes injecting into a client-side page a first proxy code with a same name as the original code and a second proxy code with a different name.

Yet another aspect of the present invention is a method for automatically generating meta-proxies for synchronous calls and asynchronous calls. The method includes providing a code operating on a server-side and callable from a client-side. The method also includes assuming a page of the code which is callable from the client-side is a page which includes the code server-side. The method further includes automatically removing and storing the server-side code. The method further includes injecting into a client-side page a first meta-proxy code with a same name as the original code and a second meta-proxy code with a different name. The method further includes generating a plurality of proxies on the client-side upon a client-side event.

Yet another aspect of the present invention is a JavaScript server architecture which includes means for automatically processing an original code for a HTML page running on a server-side and callable synchronously and asynchronously on a client-side to remove and store the original code, and a framework written in JavaScript. The framework includes means for generating a first proxy code for the original code for synchronous calls and a second proxy code for asynchronous calls, and means for injecting the first proxy code and the second proxy code into the HTML page.

To understand the differences between the server and browser sides, it's important to keep in mind the page lifecycle. The page request from the browser is received by the Web server, which fetches the appropriate HTML document (either from the file system or perhaps from another "handler" such as PHP or Ruby or Java). The Web server (Apache server) then feeds the document to the script server of the present invention, which begins to parse the HTML document and builds up the DOM tree. When the script server encounters <script> tags the script server not only adds them to the DOM but may also execute them if they have a runat attribute that indicates they should run on the server. During the parsing and execution, external content may also be fetched and loaded into the document, via <script src=" . . . "></script> elements and Jaxer.load( . . . ) for JavaScript code, or via <jaxer:include src=" . . . "></jaxer:include> (or <jaxer:include path=" . . . "></jaxer:include>) for HTML content, or via XMLHttpRequests for any content. After the DOM is fully loaded, the onserverload event is fired. This is the server-side equivalent of the onload event on the browser. The onserverload event is named differently so that a developer's code can react separately to onserverload and onload events. The script server post-processes the DOM to carry out its built-in logic and prepare the DOM for sending to the browser: removing <script> blocks meant only for the server, replacing functions to be proxied with proxies, saving (as needed) functions that should be available on callbacks, . . . etc. Finally, the DOM is serialized back to HTML, and that HTML is streamed back via the Web server to the browser.

The resulting HTML page is sent back to the browser as the response to the browser's request. The browser begins to parse the HTML, building up the DOM. When the browser encounters <script> tags the browser not only adds them to the DOM but also executes them. External JavaScript code or any other content may also be loaded. The onload event fires. Of course the page is progressively rendered throughout much of this flow, and also the user can interact with it.

Callbacks from the browser to server-side functions are handled via XMLHttpRequests. When the script server receives such a request, it creates a new, empty document (unless configured to use a different static document). The script server retrieves the saved functions that are needed to be made available during callbacks to this page. If a function called oncallback is found, it is executed. This is usually used to create the environment needed during a callback, if the saved functions are not enough. The callback function itself is executed. Finally, the result of that execution is packaged and returned as the response to the XMLHttpRequest.

While a DOM is available during callback processing, it is not serialized as HTML and returned as the response, as it was during the "regular" (non-callback) page processing flow. The DOM on script server and the DOM on the browser typically are not synchronized. Both are created from the same HTML source, but they are often subject to processing by different JavaScript code, and both come to life at different points in the page lifecycle: the DOM on the script server exists temporarily when the page is processed by the script server, and is eliminated after it's been serialized into the HTML sent to the browser; the DOM in the browser is built, on the browser, from that HTML, and is the DOM that's rendered to the user and with which the end-user interacts.

While script server and the browser may well share some code (e.g. when using runat="both"), usually the JavaScript code designated to run on script server and interacting with the script server DOM is different than the code designated to run on the client. The latter exists e.g. as a <script> tag in the script server DOM but is not executed in script server.

Remember that the only things sent to the browser at the end of page processing is what's actually in the DOM, and what the script server of the present invention has added such as proxies, clientData, and injected scripts. For example, if a developer added an expando property, which is an in-memory change to the DOM that will not get serialized, it will not appear on the client side.

var div=document.createElement ("div");
div.id="myDiv";
document.body.appendChild(div);
document.getElementById("myDiv").userId=123;

On the browser the div is present, with an id of "myDiv", but without a "userId" property. For this same reason, setting event handlers programatically rather than in the DOM will not translate to DOM changes and hence will not propagate to the browser. For example with a button: <input type="button" id="myButton" value="Click me">

A developer could add an onclick=" . . . " attribute to the tag, but this does not assist with adding the event handler programatically. The script server of the present invention provides Jaxer.setEvent (domElement, eventName, handler) function that "does the right thing" in the script server as well as on the browser. var btn=document.getElementById("myButton"); function sayHi( )) {alert ("hi")} sayHi.runat="client"; Jaxer.setEvent(btn, "onclick", sayHi);

The function used as the event handler should be made available to the browser. When setEvent is executed on the server, as above, it results in the following change to the myButton element: <input type="button" id="myButton" value="Click me" onclick="sayHi( )"> This is sent to the browser since it is a DOM change. If the function passed into setEvent has no name, its body (source) is used as the value of the attribute: var btn=document.getElementById("myButton"); Jaxer.setEvent(btn, "onclick", function( )) {alert ("hi");});

This results in the following: <input type="button" id="myButton" value="Click me" onclick="(function( )) {alert(\"hi\");}) ( )>

Which is useful for short functions but is easier to pass in the code to execute as a string: var btn=document.getEleemntById("myButton"); Jaxer.setEvent(btn, "onclick", "alert('hi')");

Which results in:<input type="button" id="myButton" value="Click me" onclick="alert('hi')">

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
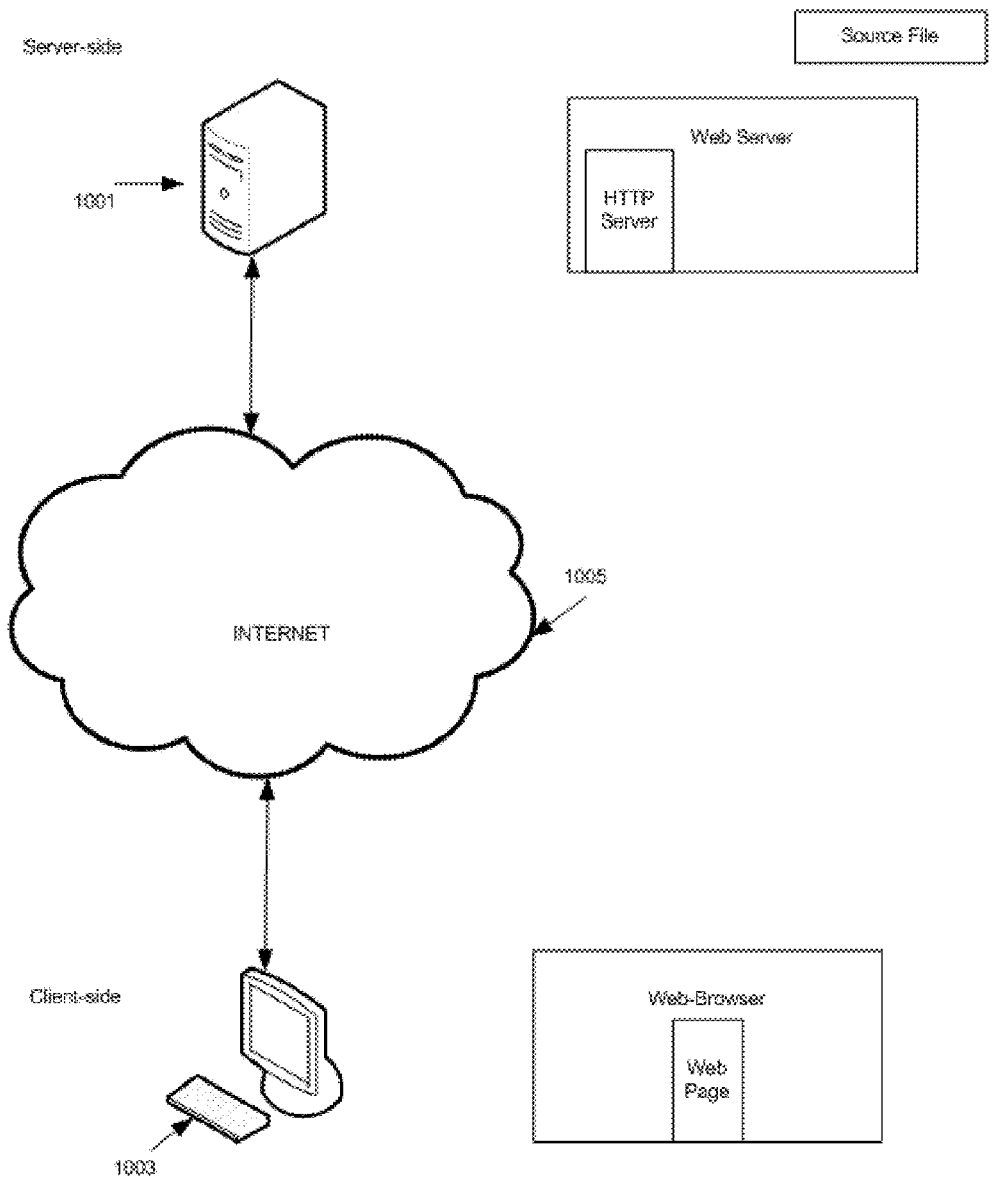
FIG. 1 is a block diagram of a web system of the prior art.
Figure 2:
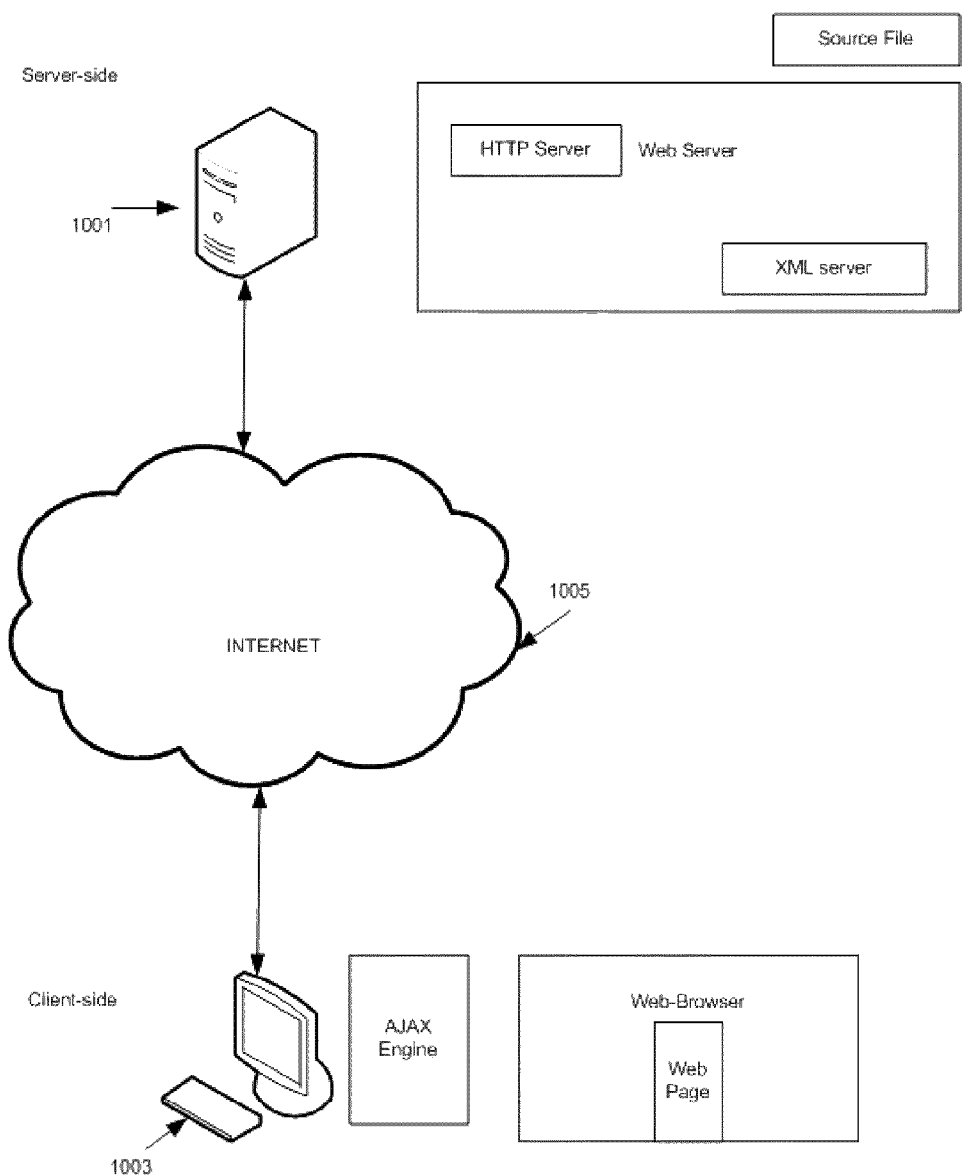
FIG. 2 is a block diagram of a web system of the prior art.
Figure 3:
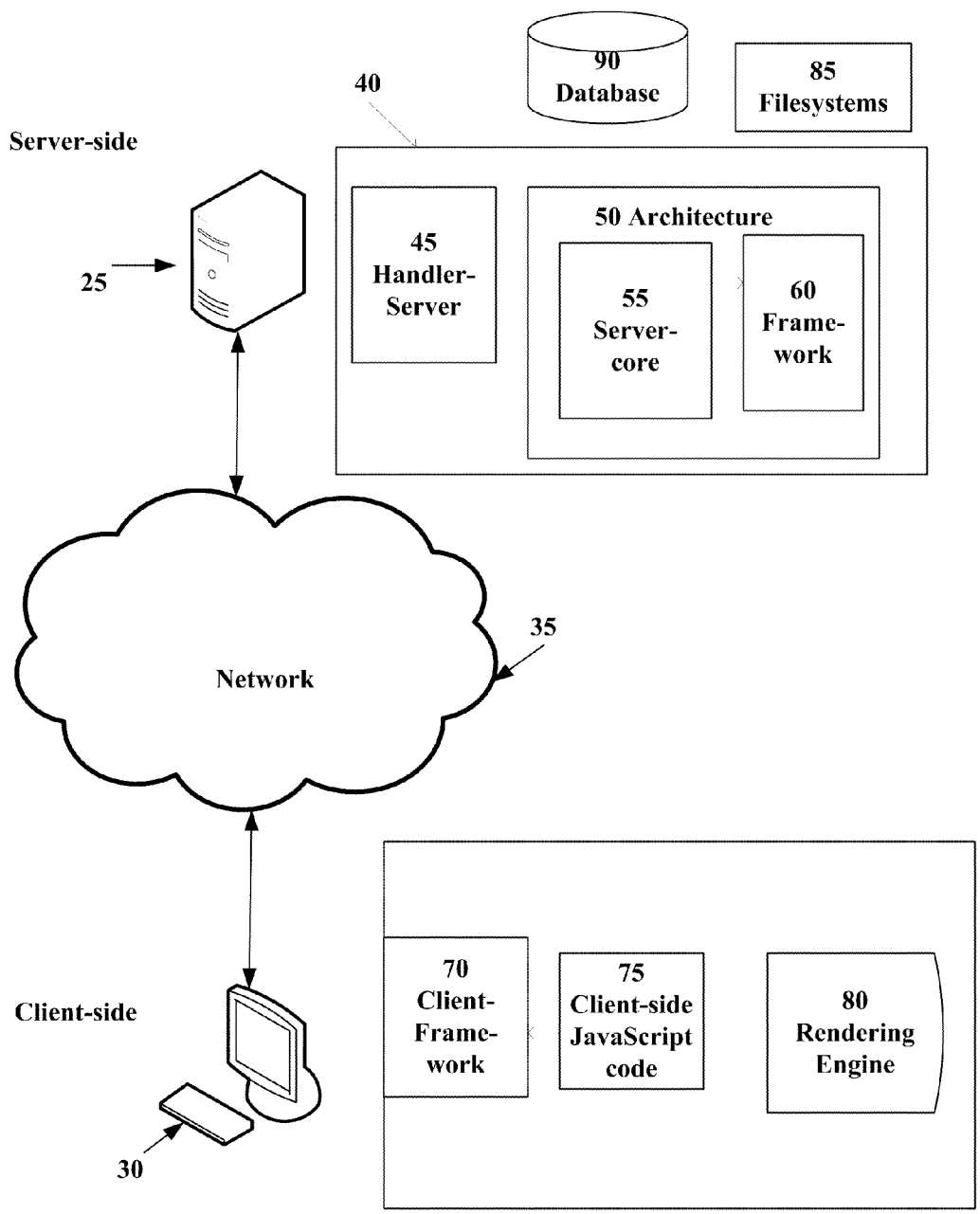
FIG. 3 is a block diagram of the system of the present invention during a callback.

As shown in FIG. 3 a system 20 of the invention generally includes a server-side 25, a client side 30 and a network or preferably the Internet 35. The server-side 25 includes a web-server 40, a handler 45 and a JavaScript server 50 preferably having a server-core 55 and a server-framework 60. The client-side 30 includes a Web-browser 65 has a client-framework 70, a client-side JavaScript code 75 and a rendering engine 80. The server-framework 60 accesses filesystems 85 and databases 90, as well as the Internet 35. A more detailed description of the abilities of the running JavaScript on the server-side and client-side is disclosed in U.S. patent application Ser. No. 12/270,817, filed Nov. 13, 2008 for A Web Server Based On The Same Paradigms As Web-Clients, which is hereby incorporated by reference in its entirety.

In FIG. 3, the system 20 is shown during a callback operation. The callback begins at the client-side JavaScript code 75 with a callback request sent to the client-framework 70. A HTTP GET/request is transmitted over the Internet 35 to the server-side 25, and received at the Web-server 40. The HTTP GET/request is sent to the server-core 55 which sends the HTTP GET/request as a callback to the server-framework 60. The server-framework 60 receives the callback, deserializes, performs the get functions, invokes, serializes and sends the response to the callback to the server-core 55. The server-core 55 sends the response to the Web-server 40 which sends the response over the Internet 35 to client-framework 70 on the Web-browser 65.

Figure 4:
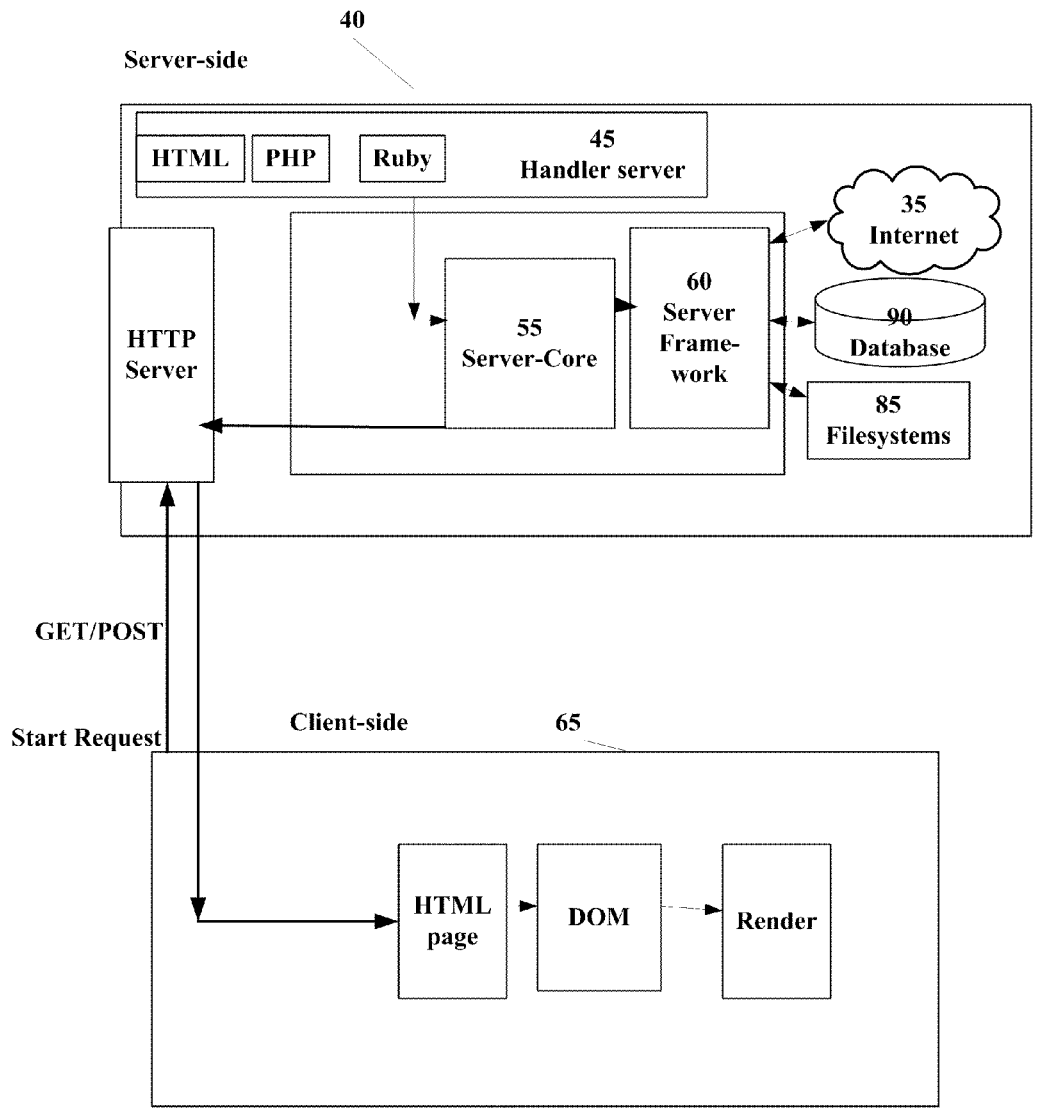
FIG. 4 is a block diagram of the system of the present invention during a normal process.
Figure 4A:
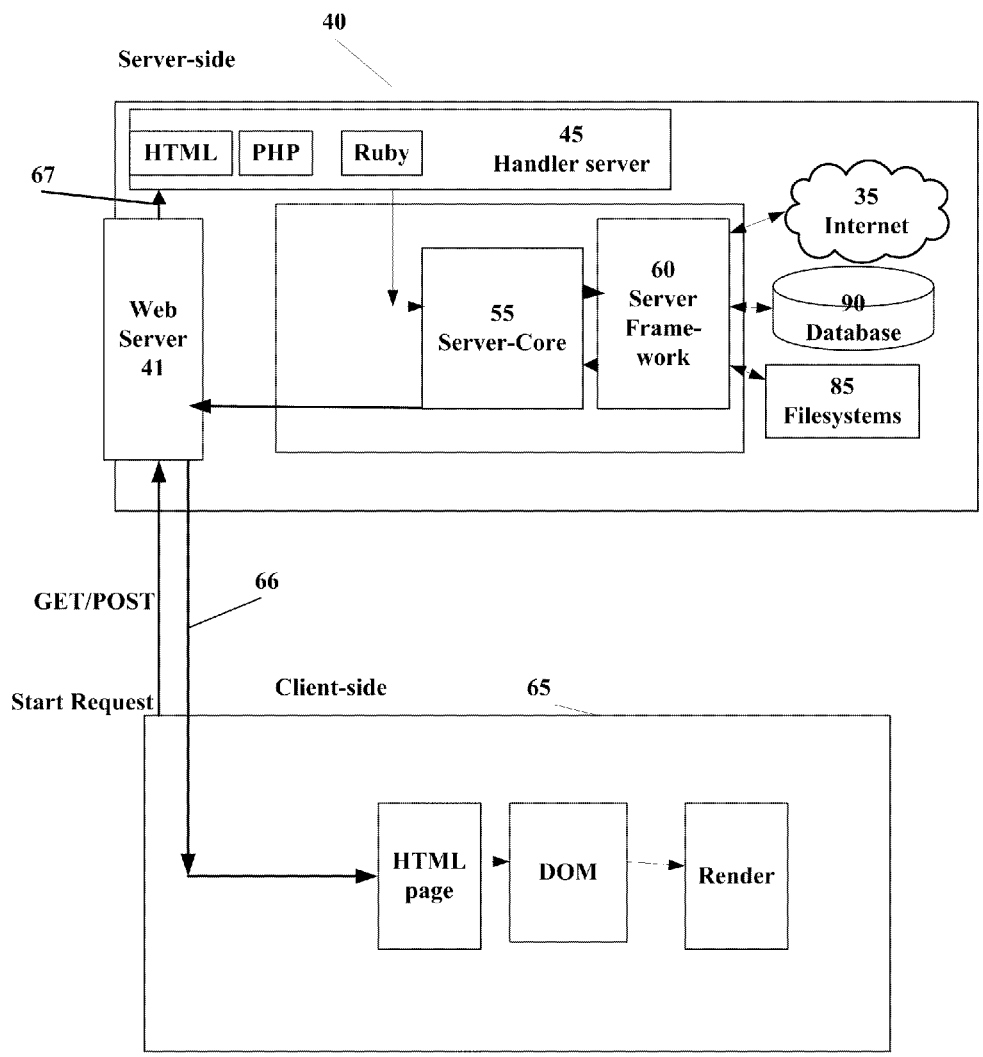
FIG. 4A is a block diagram of the system of the present invention during a normal process.

In FIG. 4, the system 20 is shown during a normal process. The process begins with a HTTP GET/request for a Web-page sent over the Internet 35 from the Web-browser 65 on the client-side 30 to the server-side 25. The HTTP Request is sent to the handler server 45. The HTML Web-page is then sent to the script server architecture 50. The server-core 55 of the script server architecture 50 parses the HTML Web-page to create a HTML DOM of the HTML Web-page. The server-core 55 also parses and interprets the JavaScript of the HTML Web-page. The server-framework 60 accesses databases 90 and filesystems 85 to respond to the Requests for the HTML Web-page. The server-framework 60 also injects proxies to modify the HTML Web-page. The server-core 55 serializes the DOM back to the HTML Web-page and the web-server 40 transmits the HTML Web-page to the client-side 30 where the Web-browser 65 renders the HTML Web-page for display for a user. As shown in FIG. 4A, a Web server (e.g., apache server) 41 receives a request from the client-side. The request 67 is sent to the handler server (PHP, Ruby or Java language) 45. The handler server 45 feeds the HTML document to script server-core 55 which begins to parse the HTML document thereby building the DOM tree for the HTML document on the server-side. Events and callbacks are sent to the script server-framework 60. The script server adds <script> tags to the DOM and executes them if the <script> has a runat attribute that indicates the <script> should be run on the server. During the parsing and execution, external content from filesystems 85, databases 90, and the like are fetched and loaded into the HTML document. After the DOM is loaded, the onserverload event is fired from the script server framework 60. The script server architecture post-processes the DOM to perform its built in logic and prepare the DOM for transmission to the client side. This post-process includes removing <script> block meant only for the server, replacing function to be proxied with proxies, saving functions that should be available as callbacks, and the like. The DOM is serialized back to HTML, and the HTML is streamed back via the web server 41 to the browser. A more detailed explanation of event-driven JavaScript architecture is set forth in Colton et al., U.S. patent application Ser. No. 12/273,539, filed on Nov. 18, 2008, for a Flexible, Event-Driven JavaScript Server Architecture, which is hereby incorporated by reference in its entirety.

Figure 10:
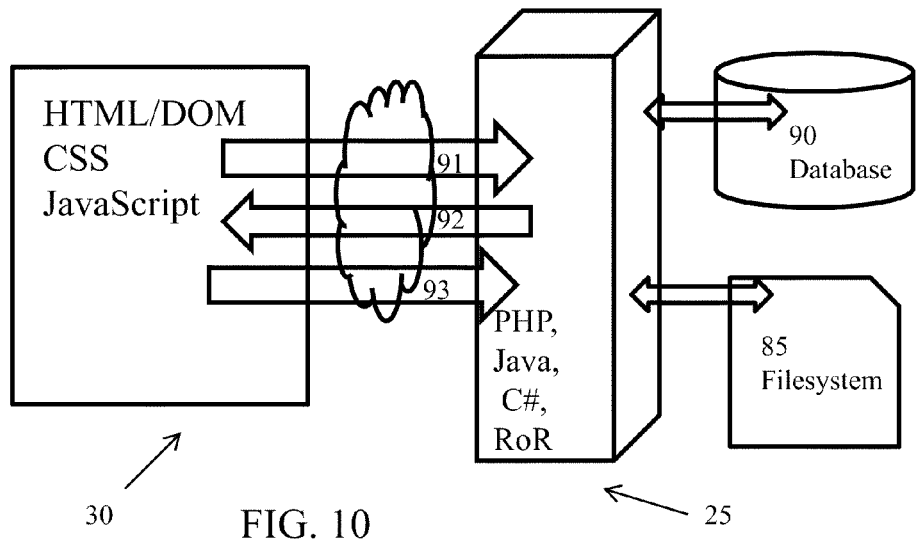
FIG. 10 is a block diagram of a prior art application stack illustrating the interactions between the client side and the server-side.
Figure 11:
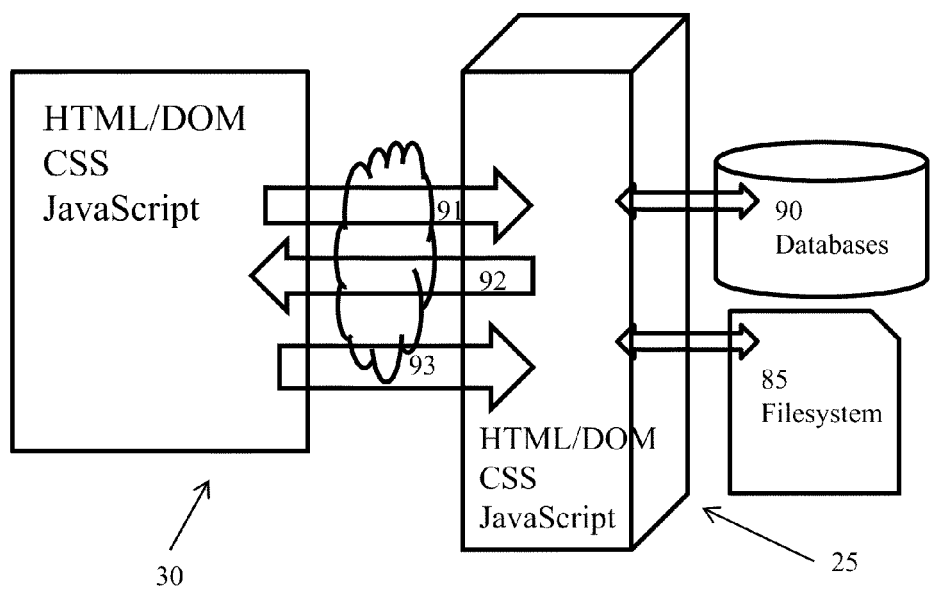
FIG. 11 is a block diagram of an application stack of the present invention illustrating the interactions between the client side and the server-side.

FIGS. 10 and 11 illustrate the difference in the application stacks between the prior art and the present invention. In both FIGS. 10 and 11, a client-side is designated 30 includes the HTML/DOM, CSS and JavaScript. In both FIGS. 10 and 11, arrow 91 is a request, arrow 92 is a response and arrow (both directions) 93 is a callback. The server-side 25 is the difference. The server-side 25 of the prior art is PHP, Java, RoR and C#. The server-side of the present invention is HTML/DOM, CSS and JavaScript. In the prior art, FIG. 10, Callbacks 93 require that the client-side 30 wrap, send, receive and unwrap the callback while the server-side 25 is required to receive, unwrap, run, wrap and send the callback. In the present invention, callbacks 93 are handled via XMLHttpRequests. When the server-side receives the request, the script-server architecture preferably creates a new, empty HTML document. The script-server architecture retrieves to this HTML document the saved functions needed to be made available during the callback. If a function designated oncallback is located, it is executed in order to create an environment needed during a callback, especially if the saved functions are not sufficient. Then, the callback function is executed and the results of the execution are packaged and returned as the response to the XMLHttpRequest.

Figure 5:
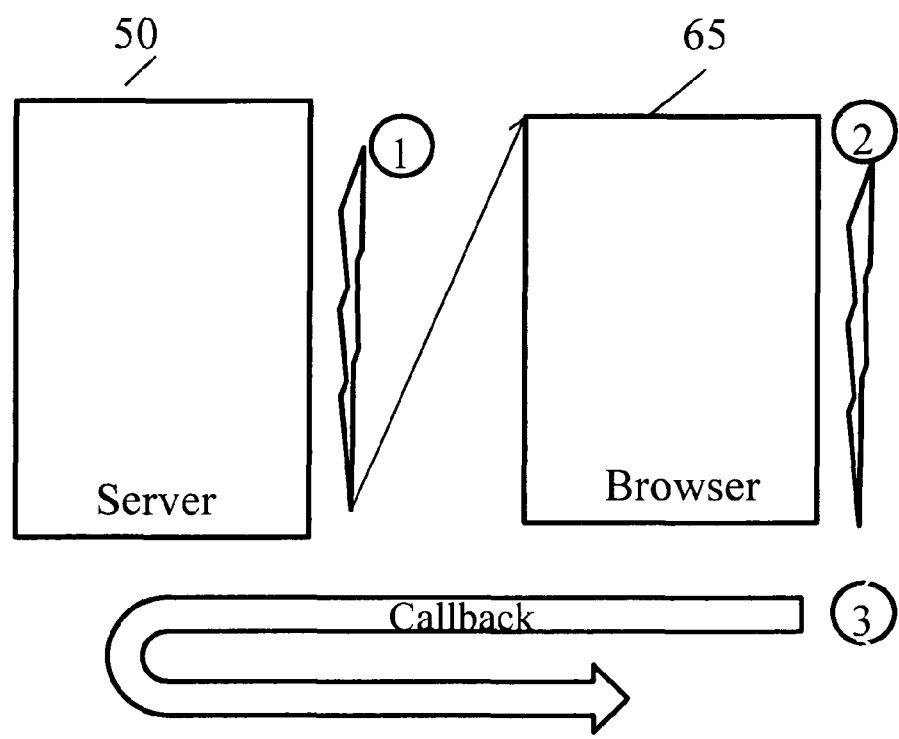
FIG. 5 is a block diagram of a callback process.

As shown in FIG. 5, the present invention allows the server 50 to execute the JavaScript functions that are set to runat="server" or runat="both". These functions might call databases, file systems, communicate across network sockets, or get session data. And since the server-side engine has a HTML DOM just like the browser, the HTML page can be manipulated through standard DOM APIs and your favorite Ajax libraries. The present invention also has session objects that can be used to persist data for users during a session or transaction. Any functions set to runat="server" are stripped from what gets sent to the browser 65. Specifically at 1, the page executes on the server 50 and a resulting HTML page is sent to the browser 65. A more detailed description of the runat function is set forth in Colton et al., U.S. patent application Ser. No. 12/270,868, filed on Nov. 14, 2008, for a System And Method For Tagging Code To Determine Where The Code Runs, which is hereby incorporated by reference in its entirety.

After server 50 sends the resulting HTML page to the browser 65, at 2 the browser 65 interprets the HTML page and executes the JavaScript within the HTML page. If JavaScript functions tagged to runat="server-proxy" are included, then the present invention automatically strips out the bodies of those functions and replaces the bodies with a new functions by the same name that know how to invoke the original function on the server 50 using Ajax calls and return the result either synchronously or asynchronously. Ajax communications do not need to be written using the present invention. Any functions not tagged with a runat attribute or set to runat="client" or runat="both" are processed by the browser 65.

Any functions set to runat="server-proxy" can now be called from the browser 65. The function is called as if it were running on the browser 65, and the present invention, automatically via XHR communications with the server 50, marshals the parameters to the server 50 where the function executes (calling databases, getting info from the session data, etc. . . . ) and returns the result to the browser 65. The "server-proxy" functions can be invoked either synchronously or asynchronously. At 3, the browser 65 calls the server 50 asynchronously for new information.

The server computer program of the present invention is pre-configured for preferable use as a plug-in to the APACHE 2.x web server. To provide standards-compliant JavaScript and DOM capabilities server-side, the server computer program is built on the MOZILLA engine, which is the same engine used in the popular FIREFOX browser. The server computer program of the present invention is layered into APACHE as an input and output filter for use to modify dynamic pages created by other languages, such as PHP or Ruby.

The server computer program of the present invention is preferably a combination of C/C++"Core" code and a server-side JavaScript "Framework." The server-core 55 provides the JavaScript parser and runtime, HTML parser and DOM engine, and an event architecture that calls the server-framework 60 as the document is being processed on the server-side 25. The server-framework 60 provides the logic, for example deciding which code to run on the server-side 25 and which on the client-side 30, creating proxies on the client-side 30 for callable server-side functions, serializing and deserializing data, and other related activities.

On the server side 25, a developer's JavaScript environment is enhanced by the server-framework 60, which provides access to the database (e.g., MySQL), file system, network, the HTTP Request and Response data, and the external server-side platforms such as Java, PHP, and Ruby.

An example of code written by a developer and prior to processing by the present invention is set forth below.

```
<html>
    <head>
        <title>Tasks</title>
        <style>
            body { font: 9pt Arial; float: left; }
            .tasks {background-color: #f0f0ff; padding: 8px;}
            .new-task {Padding-bottom: 8px;}
            .task { Padding: 4px; }
        </style>
        <script type="text/javascript" runat="server">
            Var sql = "CREATE TABLE IF NOT EXISTS tasks ( " +
                " id int (11) NOT NULL," +
                "description varchar (255),"+
                "created datetime NOT NULL" +
                ") ENGINE=InnoDB DEFAULT CHARSET=utf8;
            Aptana.DB.execute(sql);
            Window.onserverload = function( )
            {
                var resultSet = Aptana.DB.execute("SELECT * FROM tasks ORDER BY created");
                for (var i=0; i<resultSet.rows.length; i++)
                {
                    var task = resultSet.rows[i];
                    addTask(task.description, task.id);
                }
            }
            function saveTask(id, description)
            {
                var resultSet = Aptana.DB.execute("SELECT * FROM tasks WHERE id = ?", [id];
                if (resultSet.rows.length > 0) // task already exists
                {
                    Aptana.DB.execute("UPDATE tasks SET description = ? WHERE id = ?",
                        [description, id]);
                }
                else // insert new task
                {
                    Aptana.DB.execute("INSERT INTO tasks (id, description, created) " +
                        "VALUES (?, ?, NOW( ))"
                        [id, description]);
                }
            }
            saveTask.proxy = true;
            function $(id) {return document.getElementById(id); }
            $.runat = "both";
            function addTask(description, id)
            {
                var newId = id || Math.ceil(1000000000 * Math.random( ));
                var div = document.createElement("div");
                div.id = "task_" + newId;
                div.className = "task";
                var checkbox = document.createElement("input");
                checkbox.setAttribute("type", "checkbox");
                checkbox.setAttribute("title", "done");
                checkbox.setAttribute("id", "checkbox_" + newId);
                Aptana.setEvent(checkbox, "onclick", "completeTask(" + newId + ")");
                div.appendChild(checkbox);
                var input = document.createElement("input");
                input.setAttribute("type", "text");
                input.setAttribute("size", "60");
                input.setAttribute("title", "description");
                input.setAttribute("id", "input_" + newId);
                input.setAttribute("value", description);
```

```
                Aptana.setEvent(input, "onchange", "saveTask(" + newId + ", this.value)");
                div.appendChild(input);
                $("tasks").insertBefore(div, $("tasks").firstChild);
                if (!Aptana.isOnServer)
                {
                    saveTask(newId, description);
                }
            }
            addTask.runat = "both";
            function completeTask(taskId)
            {
                var div = $("task_" + taskId);
                div.parentNode.removeChild(div);
                deleteSavedTask(taskId);
            }
            completeTask.runat = "client";
            function deleteSavedTask(id)
            {
                Aptana.DB.execute("DELETE FROM tasks WHERE id = ?", [id]);
            }
            deleteSavedTask.proxy = true;
        </script>
    </head>
    <body>
        <h2>Tasks To Do</h2>
        <div><i>Any changes should be automatically saved to your database!</i><br/><br/></div>
        <div class="new-task">
            New:
            <input type="text" id="txt_new" size="60">
            <input type="button" value="add" onclick="addTask($('txt_new').value)">
        </div>
        <div id="tasks" class="tasks">
        </div>
    </body>
</html>
```

Processing of the code by the present invention results in the code being formatted as set forth below:

```
<html>
    <head>
        <script src="/aptana/framework.js?version=0.1.1.759" type="text/javascript"></script>
        <script type="text/javascript">Aptana.clientData = Aptana.Serialization.fromJSONString('{ }');</script>
        <script type="text/javascript">Aptana.Callback.id = −1407728339;</script>
        <title>Tasks</title>
        <style>
            body {
                font: 9pt Arial;
                float: left;
            }
            .tasks {
                background-color: #f0f0ff;
                padding: 8px;
            }
            .new-task {
                padding-bottom: 8px;
            }
            .task {
                padding: 4px;
            }
        </style>
        <script type="text/javascript">
            function $(id)
            {
                return document.getElementById(id);
            }
            function addTask(description, id)
            {
                var newId =id || Math.ceil(1000000000 * Math.random( ));
```

```
        var div = document.createElement("div");
        div.id = "task_" + newId;
        div.className = "task";
        var checkbox = document.createElement("input");
        checkbox.setAttribute("type", "checkbox");
        checkbox.setAttribute("title", "done");
        checkbox.setAttribute("id", "checkbox_" + newId);
        Aptana.setEvent(checkbox, "onclick", "completeTask(" + newId +
")");
        div.appendChild(checkbox);
        var input = document.createElement("input");
        input.setAttribute("type", "text");
        input.setAttribute("size", "60");
        input.setAttribute("title", "description");
        input.setAttribute("id", "input_" + newId);
        input.setAttribute("value", description);
        Aptana.setEvent(input, "onchange", "saveTask(" + newId + ",
this.value)");
        div.appendChild(input);
        $("tasks").insertBefore(div, $("tasks").firstChild);
        if (!Aptana.isOnServer)
        {
            saveTask(newId, description);
        }
    }
    function completeTask(taskId)
    {
        var div =$("task_" + taskId);
        div.parentNode.removeChild(div);
        deleteSavedTask(taskId);
    }
    function saveTask( )
    {
        return Aptana.Callback.invokeFunction.call(null, "saveTask",
arguments);
    }
    function saveTaskAsync(callback)
    {
        return Aptana.Callback.invokeFunctionAsync.call(null, callback,
"saveTask", arguments);
    }
    function deleteSavedTask( )
    {
        return Aptana.Callback.invokeFunction.call(null, "deleteSavedTask",
arguments);
    }
    function deleteSavedTaskAsync(callback)
    {
        return Aptana.Callback.invokeFunctionAsync.call(null, callback,
"deletesavedTask", arguments);
    }
    </script>
    </head>
    <body>
      <h2>Tasks To Do</h2>
      <div>
          <i>Any changes should be automatically saved to your
          database!</i>
          <br>
          <br>
      </div>
      <div class="new-task">
          New:<input id="txt_new" size="60" type="text"><input
          value="add" onclick="addTask($('txt_new').value)" type="button">
      </div>
<div id="tasks" class="tasks">
</div>
</body>
</html>
```

Figure 6:
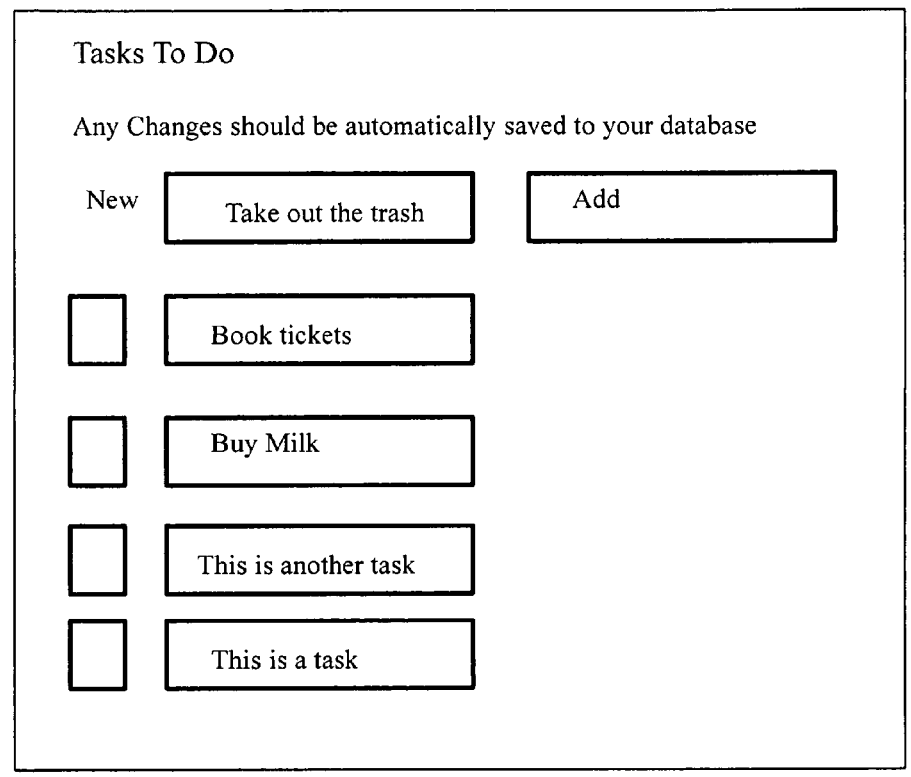
FIG. 6 is a Web-page generated by the code.

FIG. 6 is a screen display 99 of the code set forth above.

Figure 7:
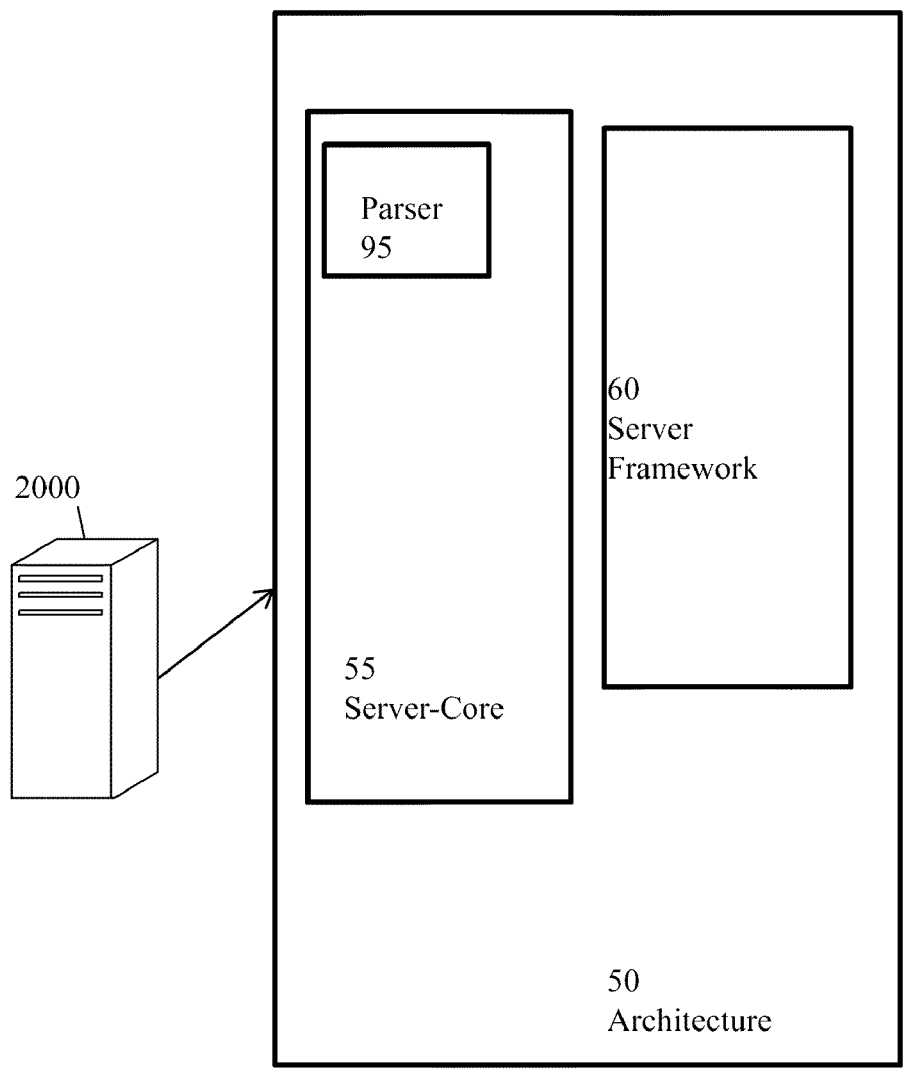
FIG. 7 is a block diagram of the server of the system of the present invention.

As shown in FIG. 7, a server-computer 2000 contains server architecture 50. The server-architecture 50 includes the server-core 55 and the server-framework 60. The server-core 55 includes a JavaScript parser 95. The server-computer 2000 is preferably a conventional server-computer available from IBM, HP, APPLE, DELL, and SUN.

Figure 7A:
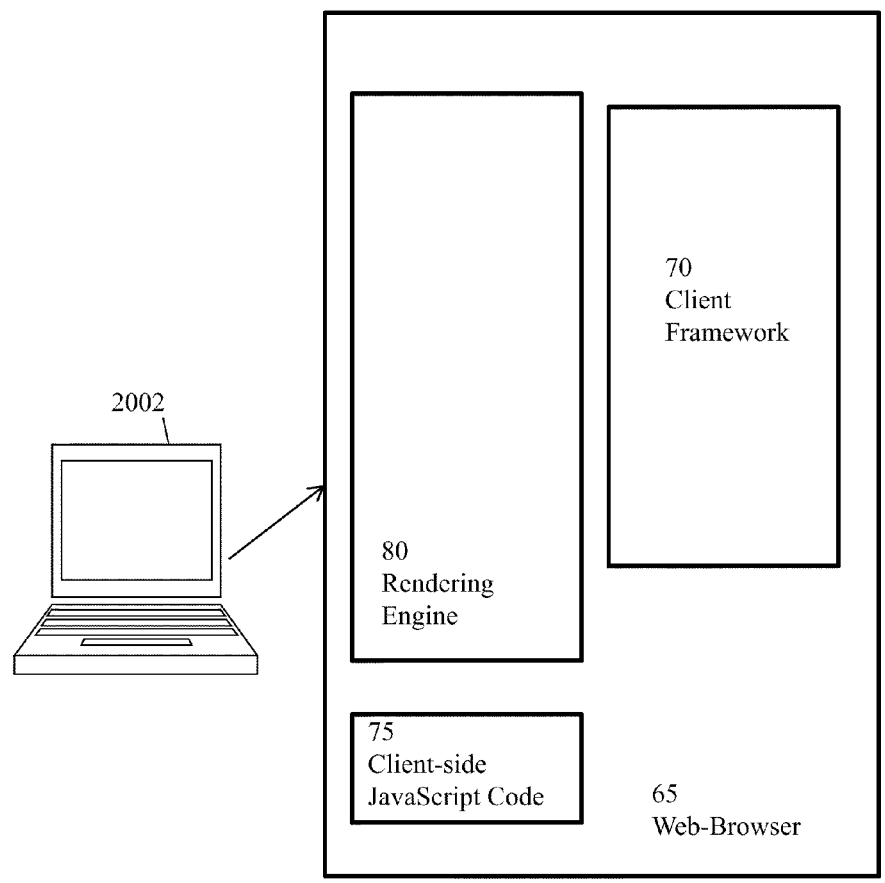
FIG. 7A is a block diagram of the user-computer of the system of the present invention.

As shown in FIG. 7A, a user-computer 2002 contains a Web-browser 65. The Web-browser 65 preferably includes the client framework 70, client-side JavaScript code 75 and the rendering engine 80. The user-computer 2002 is preferably a conventional user-computer such as a PC available from HP, DELL, and GATEWAY, or a MAC available from APPLE. The Web-browser 65 is preferably MICROSOFT INTERNET EXPLORER, NETSCAPE, APPLE SAFARI, MOZILLA FIREFOX, or OPERA.

Figure 8:
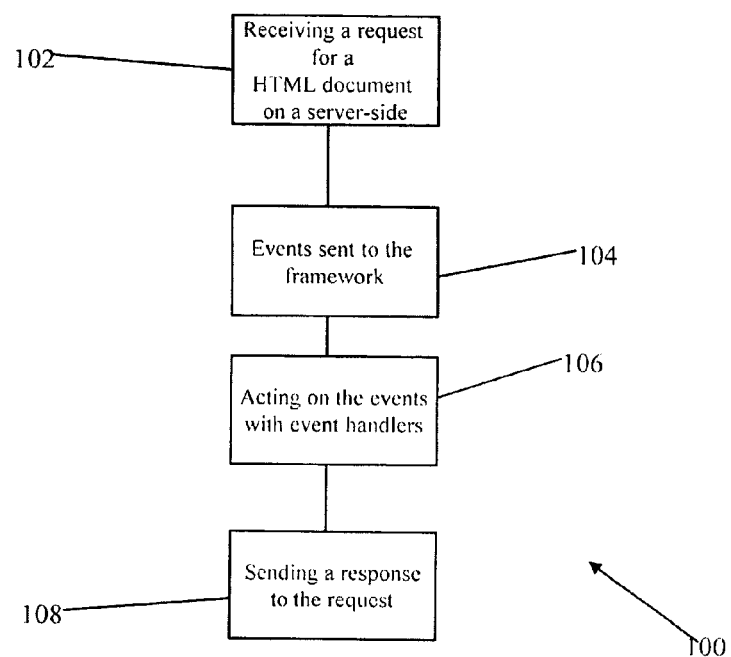
FIG. 8 is a flow chart of a general method.
Figure 9:
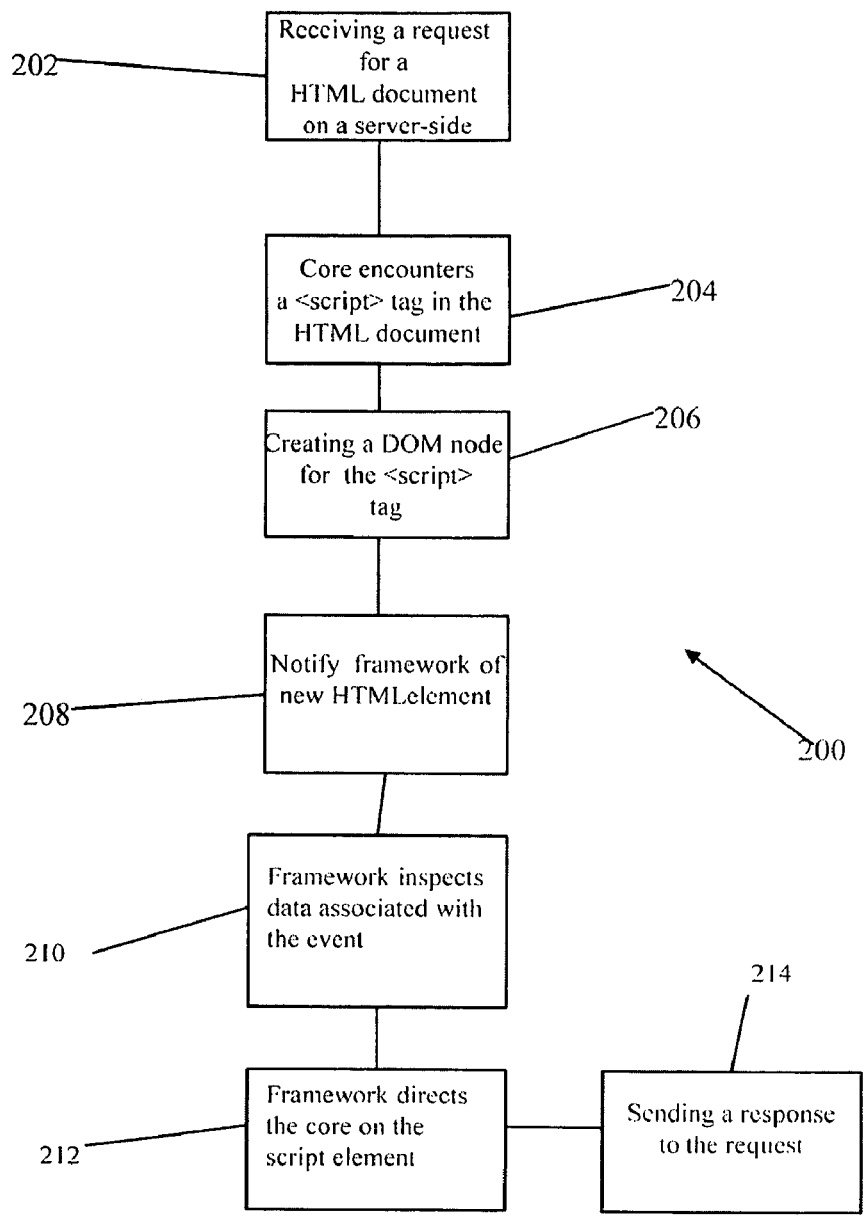
FIG. 9 is a flow chart of a more specific method.

FIGS. 8 and 9 illustrate general methods. A general method of the present invention begins with a code operating on a server-side is provided and callable from a client-side. A page of the code which is callable from the client-side is assumed to be a page which includes the code server-side. The server-side code is automatically removed and stored. Proxy code with the same name as the original code is injected into the client-side page. Alternatively, a first proxy code with the same name as the original code and a second proxy code with a different name are injected into the client-side page.

A more specific method of the present invention for automatically generating meta-proxies begins with a code operating on a server-side is provided and callable from a client-side. A page of the code which is callable from the client-side is assumed to be a page which includes the code server-side. The server-side code is automatically removed and stored. Meta-proxy code with the same name as the original code is injected into the client-side page. Alternatively, a first meta-proxy code with the same name as the original code and a second meta-proxy code with a different name are injected into the client-side page. Multiple proxies are generated on the client-side upon a client-side event.

A more specific method of the present invention begins on the client-side, a proxy code with the same name as an original code accepts the same inputs as an original, server-side function. The data is packaged and the server is called. The server verifies that the call came from the same page as the proxy code was defined in. The server finds the original code or reconstitutes the original code. The data is passed to the original code and the function is completed. The return data, if any, is packaged. The packaged return data is returned to the client-side where it becomes the return value from the proxy code.

Another specific method of the present invention begins with an HTML document starting life on the server, either as a static HTML file read from disk, or as a dynamic page generated by PHP, Ruby, Java, etc. The server core 55 receives the HTML document as an output (post-process) filter from APACHE, and starts to parse and execute the HTML document, similar to a browser. The server-core 55 creates and populates the DOM, executes the JavaScript code designated to run on the server-side 25, and continues until the entire HTML document is completed. The server-framework 60 modifies the DOM by generating proxies that automatically replace server-side client-callable functions. The new DOM is serialized as an HTML document on the server-core 55 and streamed out to the client-side 30. The client-side receives the HTML document and the processing continues, recreating the DOM from HTML document and executing the remaining client-side JavaScript. One of the client-side proxy functions is called and its parameters are automatically serialized into JSON. A XML HTTP request is sent to the server to invoke the original function with the parameters. The server receives the XML HTTP request. The parameters are deserialized. The function to be invoked is restored and called with these parameters. The results and any exception are serialized back into JSON. The data is returned to the client-side where it is deserialized and returned as the result of the proxy.

Server-side functions can be declared to be proxied so they are callable from the client side. This is achieved by specifying a proxy property on the function object. The possible values for this property are true or false. This is only required for enabling the proxying of the function. By default, in a <script runat="server"> block, the functions are not proxied. Note that if a function is not proxied, it isn't just that proxies are not inserted into the client to facilitate calling it: it's actually marked as not callable on the server, so hacking the client to try to call the function on the server will not work.

EXAMPLE ONE

The following example illustrates one simple way of using the proxy options in a typical code scenario. Group all the server-side code in one script block, and explicitly designate a subset of function to be proxied. Then all client-side code goes in a different script block (where there isn't even the option of programmatically changing it by setting a different runat or proxy value). Of course those skilled in the pertinent art may choose different ways of organizing the code. Further, for large amounts of code, one has the option to extract the code into (reusable) external JavaScript files.

The _login.js file referenced in the example illustrated in the code below which contains some functions that explicitly override the runat='server' directive specified on the script tag used to load the file.

```
<script type="text/javascript" runat="server">
function setPassword(username, newPassword)
{
   // put code in here to directly set the password of a given username
   // this code should not be callable from the client
}
function changePassword(username, oldPassword, newPassword)
{
   // put code in here to first verify the submitted password,
   // and then - if successful - call setPassword to actually make changes
   // this code should be callable from the client
}
changePassword.proxy = true;
</script>
<script type="text/javascript">
function submitPassword( )
{
   // put client-side code here to grab the username and old and new passwords
   // and call changePassword on the server
}
</script>
```

In the snippet illustrated below, the function is proxied.
```
function checkCredentials(username, password)
{
   var rs = Aptana.DB.execute("SELECT * FROM users WHERE
username = ? AND password = ?",
         [username, password]);
   if (rs.rows.length == 0)
   {
      return "";
   }
   var user = rs.rows[0];
   makeAuthenticated(user);
   return user.username;
}
checkCredentials.proxy = true;
```

In the snippet illustrated below, the function runs on the client-side.

```
function login( )
{
   var username = $('username').value;
   var password = $('password').value;
   var username = checkCredentials(username, password);
   if (username != "")
   {
      fromTemplate('loginComponent', 'loginAuthenticated');
setTimeout("$('authenticatedUsername').innerHTML =
'" + username + "'", 0);
      changeAuthentication (true);
   }
   else
   {
      $('loginMessage').innerHTML = "Sorry, try again";
   }
}
login.runat = "client";
```

Below is an illustration of object inside an Aptana namespace to allow the proxy functions to be declared in a single group within JavaScript code.
Aptana.proxies=[myFunc1, myFunc2, "myFunction"];
// . . .
Aptana.proxies=Aptana.proxies.push[myFunc3, "myFunction4"];

This code is presented in such a way that it is executed by the server prior to DOM serialization. One can also use this code to remove the proxied functions by setting the value to null. Also, Aptana.proxies is not a complete collection of the functions being proxied by the server it is just a convenient way to express the myFunc.proxy=true; syntax for multiple function references.

EXAMPLE TWO

In another example, code written by a Web developer prior to processing by script server architecture of the present invention is set forth below.

```
<html>
   <head>
      <script runat='server-proxy'>
         function getName(id)
         {
            return Jaxer.DB.execute("SELECT name FROM users WHERE id = ?", id).singleResult;
         }
         function countUsers( )
         {
            return Jaxer.DB.execute("SELECT COUNT(*) FROM users").singleResult;
         }
      </script>
   </head>
   <body>
      <script>
         function showNameAndUsers( )
         {
            document.getElementById('output').innerHTML =
               getName(id) + " is one of " + countUsers( ) +
               " users";
         }
      </script>
      <input type="button" value="Click me"
         onclick="showNameAndUsers(1)">
      <div id="output"></div>
   </body>
</html>
```

Then after processing by the script server architecture of present invention, the code is as set forth below.

```
<html>
<head>
    <script type="text/javascript"
src="/jaxer/framework/clientFramework_compressed.js?
version=1.0.0.4252">
    </script>
    <script type="text/javascript">
        Jaxer.Callback.pageSignature = −1745593693;
        Jaxer.Callback.pageName = '127.0.0.1:8081/repo/APT-010.html';
        Jaxer.CALLBACK_URI = '/jaxer-callback';
        Jaxer.ALERT_CALLBACK_ERRORS = false;
    </script>
    <script>
        eval(Jaxer.Callback.createProxies(['getName', 'countUsers']));
    </script>
</head>
<body>
    <script>
        function showNameAndUsers( )
        {
            document.getElementById('output').innerHTML =
            getName(id) +
            " is one of " +
            countUsers( ) +
            " users";
        }
    </script>
    <input value="Click me" onclick="showNameAndUsers(1)"
type="button">
    <div id="output">
    </div>
</body>
</html>
```

There is a meta-proxy call to Jaxer.Callback.createProxies for getName and countUsers, which will in turn create proxy functions for getName and countUsers, and when one calls each of them they will automatically call their server-side namesakes. The functionality can be expanded to change each of these proxies or meta-proxies such that, when first invoked, they either call back their server-side implementations (like the above) or download the implementation and execute it client-side (for those functions that can run client-side).

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for automatically generating proxies, the method comprising:
   automatically removing a first code from an HTML document at a server-core on a server-side of a network, the HTML document being callable from a client-side of the network, the first code having a first designation, wherein the first code comprises computer instructions to be executed on the server-side of the network; and
   injecting a proxy code with a designation the same as the first designation for the first code into the HTML document, wherein the proxy code is configured to allow a call from the client-side of the network to request execution of the computer instructions on the server-side of the network.

2. The method according to claim 1 wherein the proxy code is configured to accept one or more inputs which correspond to respective one or more inputs of the first code.

3. The method according to claim 1 further comprising:
   remotely calling the server-side with the proxy code;
   verifying the call as originating from the HTML document;
   locating the first code;
   passing any inputs included in the call to the first code;
   completing a function of the first code;
   packaging any return data;
   returning the any return data to the client-side to generate a return value from the proxy code.

4. The method of claim 1 wherein the proxy code is configured to allow the call from the client-side of the network to request execution of the computer instructions on the server-side of the network without reloading the HTML document on the client-side of the network.

5. The method of claim 1 wherein the call comprises an asynchronous call.

6. A method for automatically generating meta-proxies, the method comprising:
   automatically removing a first code from an HTML document at a server-core on a server-side of a network, the HTML document being callable from a client-side of the network, the first code having a first designation, wherein the first code comprises computer instructions to be executed on the server-side of the network;
   injecting a meta-proxy code with a designation the same as the first designation for the first code into the HTML document, wherein the meta-proxy code is configured to allow a call from the client-side of the network to request execution of the computer instructions on the server-side of the network; and
   generating a plurality of proxies on the client-side upon a client-side event.

7. The method according to claim 6 further comprising:
   injecting a second meta-proxy code with a second designation into the HTML document.

8. The method according to claim 7 wherein the second meta-proxy code is for asynchronous calls.

9. The method according to claim 6 wherein the client-side event is an arrival of the meta-proxy code on the client-side.

10. The method of claim 6 wherein the meta-proxy code is configured to allow the call from the client-side of the network to request execution of the computer instructions on the server-side of the network without reloading the HTML document on the client-side of the network.

11. A method for automatically generating proxies, the method comprising:
    automatically removing a first code from an HTML document at a server-core on a server-side of a network, the HTML document being callable from a client-side of the network, the first code having a first designation, wherein the first code comprises computer instructions to be executed on the server-side of the network; and
    injecting into the HTML document a first proxy code with a designation the same as the first designation of the first code and a second proxy code with a second designation, wherein the second proxy code is configured to allow a call from the client-side of the network to request execution of the computer instructions on the server-side of the network.

12. The method according to claim 11 wherein the second proxy code is for asynchronous calls.

* * * * *